United States Patent
Subramanian et al.

(10) Patent No.: US 8,719,830 B2
(45) Date of Patent: May 6, 2014

(54) SYSTEM AND METHOD FOR ALLOWING EXECUTING APPLICATION IN COMPARTMENT THAT ALLOW ACCESS TO RESOURCES

(75) Inventors: Murali Subramanian, Bangalore Karnataka (IN); Ratan Prasad Nalumasu, Santa Clara, CA (US); Animesh Singh, Andhra Pradesh (IN); Chandrika Malurpatna Sreedhar, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1414 days.

(21) Appl. No.: 12/195,934

(22) Filed: Aug. 21, 2008

(65) Prior Publication Data
US 2009/0150886 A1    Jun. 11, 2009

Related U.S. Application Data

(60) Provisional application No. 60/996,905, filed on Dec. 10, 2007.

(51) Int. Cl.
  *G06F 9/46* (2006.01)
(52) U.S. Cl.
  USPC ........................................................ 718/104
(58) Field of Classification Search
  None
  See application file for complete search history.

(56) References Cited

U.S. PATENT DOCUMENTS

| | | | |
|---|---|---|---|
| 6,801,940 B1 | 10/2004 | Moran et al. | |
| 7,748,005 B2 * | 6/2010 | Romero et al. | 718/104 |
| 7,930,539 B2 * | 4/2011 | Soltis et al. | 713/167 |
| 2002/0092003 A1 | 7/2002 | Calder et al. | |
| 2002/0184525 A1 | 12/2002 | Cheng | |
| 2003/0009685 A1 | 1/2003 | Choo et al. | |
| 2003/0084436 A1 | 5/2003 | Berger et al. | |
| 2003/0126464 A1 | 7/2003 | McDaniel et al. | |
| 2003/0131246 A1 * | 7/2003 | Reeves et al. | 713/182 |
| 2003/0145235 A1 * | 7/2003 | Choo | 713/201 |
| 2003/0149895 A1 | 8/2003 | Choo et al. | |
| 2003/0172109 A1 | 9/2003 | Dalton et al. | |
| 2004/0133777 A1 | 7/2004 | Kiriansky et al. | |
| 2004/0267897 A1 | 12/2004 | Hill et al. | |
| 2005/0028003 A1 | 2/2005 | Wray | |
| 2005/0091505 A1 | 4/2005 | Riley et al. | |
| 2005/0114870 A1 * | 5/2005 | Song et al. | 719/328 |
| 2005/0193427 A1 | 9/2005 | John | |
| 2006/0101413 A1 | 5/2006 | Kinno et al. | |
| 2006/0136929 A1 * | 6/2006 | Miller et al. | 718/105 |

OTHER PUBLICATIONS

HP-UX 11i Secuirty Containment Administrator's Guide Version B. Nov. 23, 2002, Hewlett-Packard Development Company, L.P., 2007, pp. 1-84.
Policy Language and the Example Policy Configuration, Configuring the SELinux Policy. Downloaded: Nov. 29, 2011, pp. 1-20. <nsa.gov/research/_files/selinux/papers/policy2/x109.shtml>.

* cited by examiner

*Primary Examiner* — Camquy Truong

(57) ABSTRACT

A method of producing a compartment specification for an application, the method comprising executing the application; determining resource requests made by the executing application; and recording the resource requests in the compartment specification.

11 Claims, 3 Drawing Sheets

SYSTEM AND METHOD FOR ALLOWING EXECUTING APPLICATION IN COMPARTMENT THAT ALLOW ACCESS TO RESOURCES

CROSS-REFERENCE TO RELATED APPLICATIONS

This Utility Patent Application is based on and claims the benefit of U.S. Provisional Application No. 60/996,905, filed on Dec. 10, 2007, the contents of which are hereby incorporated by reference in their entirety.

BACKGROUND TO THE INVENTION

Businesses across the globe are faced with rapidly changing, sophisticated attacks against their IT infrastructure. A typical large organization may have several hundred servers, and managing security can be a challenge. To help businesses combat increasingly complex threats of attackers, operating system vendors have introduced compartmentalization. Similar to the design of a submarine, compartments are logical partitions to provide logical isolation between applications and/or resources. When configured in a secure compartment, an application or resource has restricted access to other resources and/or applications. For example, a compartment specification associated with an application may indicate details of how an application or resource can access other applications and/or resources. The compartments may be enforced by compartmentalization software, for example. A compartment provides greater security for an application or resource, or a system associated with the application or resource, when compared to an application executing outside of a secure compartment, as an application or resource outside of any compartment may have unrestricted access to all system applications and resources. The compartmentalization software, by enforcing compartments according to their compartment specifications, may, for example, implement a MAC (mandatory access control) security policy.

For example, when an application makes a request to use a resource that is not specified in a compartment specification associated with the application, the resource request is denied. Therefore, if the application has been compromised, for example by an external attacker, the application cannot be used by the attacker to access any applications resources not specified in the compartment specification for the application. Where applications or resources are specified, the application cannot be used by the attacker to access those applications or resources in ways not specified in the compartment specification.

An example of a compartment specification may list all possible application and resource requests that may be made by the application, so that the application has full functionality when it executes within a compartment. A compartment specification may be produced, for example, manually by a system administrator, who may need knowledge of the applications and resources on a data processing system, the data processing system itself and the operating system of the data processing system.

It is an object of embodiments of the invention to at least mitigate one or more of the problems of the prior art.

BRIEF DESCRIPTION OF THE DRAWINGS

Embodiments of the invention will now be described by way of example only, with reference to the accompanying drawings, in which.

DETAILED DESCRIPTION OF EMBODIMENTS OF THE INVENTION

Embodiments of the invention can be used to automatically produce or augment a compartment specification for an application or resource, so that the application or resource can subsequently execute in a secure compartment according to the compartment specification. Manually producing the compartment specification may lead to errors being introduced into the specification and may also require detailed knowledge of the application or resource and how it will be used, the data processing system on which the application will execute or in which the resource resides, and the operating system of the data processing system. Furthermore, particularly for large and complex applications, some functionality may be missed from the compartment specification, leading to reduced functionality of the application or resource when residing in a compartment, and a large amount of time may be required to generate the specification. Automatically generating the compartment specification may reduce or eliminate at least some of these problems.

Older, "legacy" applications may not have associated source code available. Therefore, it may be harder to manually create a compartment specification for legacy applications, as examining the source code of an application may help in manually creating a compartment specification.

Embodiments of the invention may help rapid application deployment. Known methods for producing a compartment specification may be time-consuming and error-prone, and introduced errors may further contribute to a delay in producing a compartment specification, which may be required before an application is deployed for use. Embodiments of the invention may produce a compartment specification more quickly and hence allow applications to be deployed more quickly.

The compartment specification and secure compartment may be used to protect against attacks on a system using an application or resource residing in the secure compartment. For example, a vulnerability in an application such as a buffer overflow may be exploited by an attacker to execute code. The attacker may then attempt to access system resources to use or disable the resource. However, the secure compartment would not allow the attacker to access system resources except those resources and ways of accessing the resources specified in the compartment specification. Alternatively, for example, an unauthorized application executing on a data processing system may be prevented from accessing resources on that data processing system by resources' compartment specifications.

Figure 1:
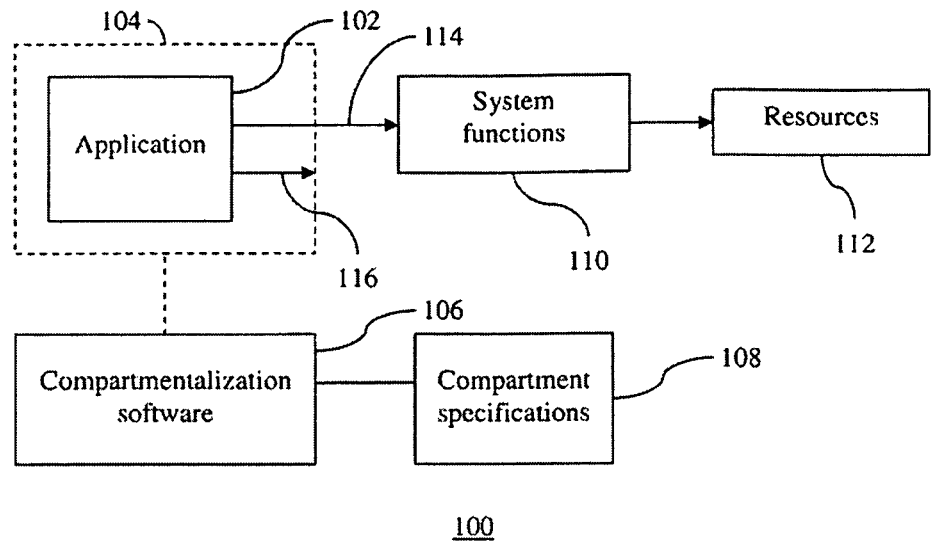
FIG. 1 shows an example of a system for executing an application in a secure compartment.

FIG. 1 shows a system 100 for executing an application 102 in a secure compartment 104. The compartment 104 is enforced by compartmentalization software 106. The compartmentalization software 106 may enforce any number of compartments, each containing an application or a resource, or multiple applications or resources. The application 102 is associated with a compartment specification 108, which includes a list of the resource requests permitted by the application 102.

The compartmentalization software 106 may comprise, for example, Security Containment software that can be used with (or is supplied with) the HP-UX operating system, or Type Enforcement that can be used with the SELinux (Security Enhanced Linux) operating system. However, in alternative embodiments, other compartmentalization software and/or other operating systems may be used. The compartmentalization software 106 may be supplied with or as part of an operating system, or supplied separately.

The application 102 makes a resource request by calling a system function 110. The compartmentalization software 106 detects calls to the system functions 110 and determines whether the resource request is permitted by consulting the compartment specification 108 associated with the application 102. If the resource request is permitted, as indicated by the compartment specification 108, then the compartmentalization software 106 allows the application 102 to call the appropriate system function 110. The system functions 110 handle the resource requests and provisioning of the resources 112 to the application 102.

For example, the compartmentalization software 106 may detect a call 114 to a system function 110 and consult the compartment specification 108 to determine whether the resource requested in the call to the system function 110 is permitted. If it is permitted, then the application 102 will successfully call a system function 110, which will handle the resource request.

If the application 102 makes a resource request that is not permitted then the compartmentalization software 106 will prevent the call 116 to the system function 110 from being successful. Thus, the application 102 is prevented from making resource requests that are not permitted. The compartmentalization software may return to the application indicating that an error has occurred, for example that the resource request was unsuccessful or that the request was not permitted. A resource request that is not permitted is not indicated as permitted in the compartment specification, and/or is indicated as not permitted in the compartment specification.

A resource request may be made by an application for a resource that is available on or to a data processing system on which the application is executing. Resources may include, for example, file system objects such as files and directories, inter-process communication objects that enable an application to communicate with other applications, network communications resources that allow the application to communicate with other systems over a network, and ports in a data processing system. A resource request is a request to interact with a resource. Therefore, for example, where a resource is a data file on a file system, an application may make a resource request to read from the file or write to the file, and where a resource is a port, the application may make a resource request to bind with the port. A resource request may indicate the mode of access. For example, a resource request to access a data file may indicate a "read-only" mode of access or a "write" mode of access.

The use of applications and/or resources in secure compartments enhances the security of the applications, resources and/or the data processing system on which they reside, and/or the operating system on the data processing system. This is because applications may be prevented from interacting with resources and each other in unexpected ways. For example, if an application was compromised by a remote attacker, the remote attacker could not use the compromised application to attack the system as the application would be prevented from exhibiting unexpected behavior by the compartmentalization software. More specifically, the remote attacker cannot use the application to access resources in a way that is not specified in the compartment specification for the application.

Figure 2:
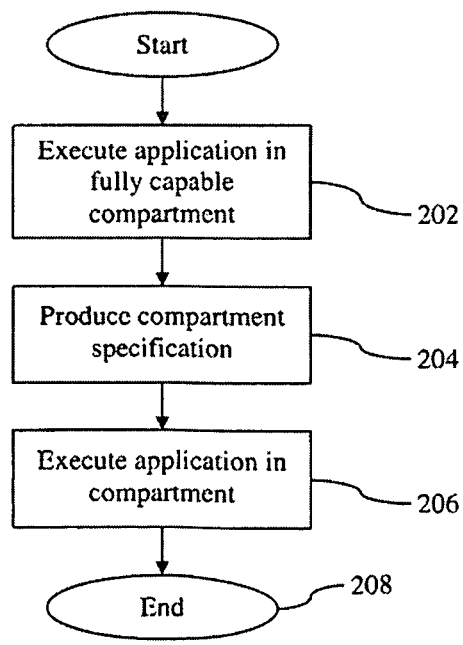
FIG. 2 shows an example of a method according to embodiments of the invention.

FIG. 2 shows an example of a method 200 of producing a compartment specification according to embodiments of the invention. The method 200 starts at step 202 where the application or resource is placed in a fully capable compartment. A fully capable compartment is a compartment that allows all access. The compartmentalization software will not block any resource requests made from inside or outside the fully capable compartment. Next, in step 204, the compartment specification is automatically produced as indicated in more detail below. Once the compartment specification has been produced in step 204, the method 200 in step 206 may cause the application or resource in a secure compartment according to the compartment specification produced in step 204. That is, the application or resource will only be permitted to operate in ways exhibited while the compartment specification was being produced in step 204. Once the application or resource resides in a secure compartment, the method 200 ends at step 208.

The fully capable compartment may be provided by compartmentalization software for execution of certain applications on a data processing system. For example, some system applications may require access to many resources on a data processing system and are therefore executed in the fully capable compartment to avoid the need for a large, complex compartment specification. These system applications may include, for example, inctd, which monitors internet ports on Unix-based systems, and the swapper, which handles memory allocation for processes and influences CPU allocation on Unix-based systems.

Figure 3:
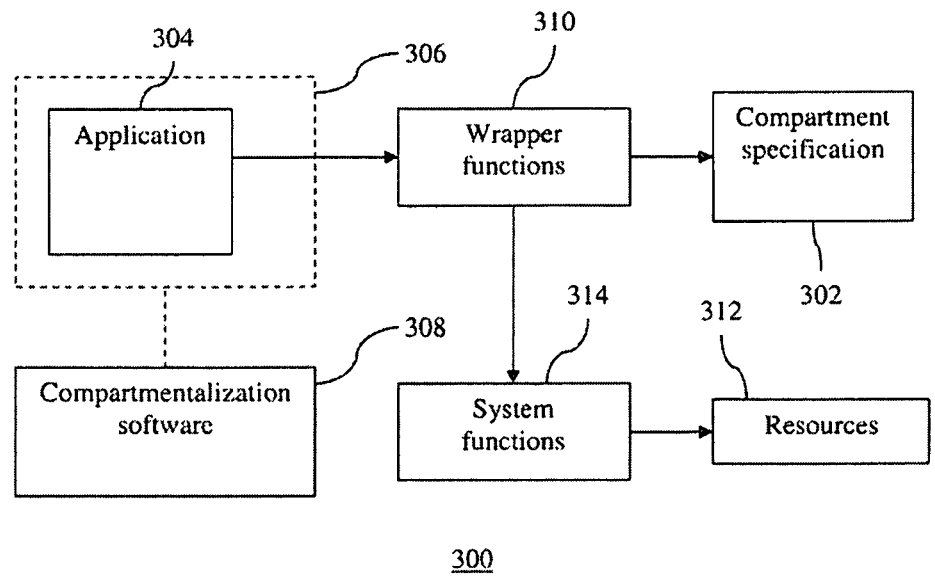
FIG. 3 shows an example of a system for producing a compartment specification according to embodiments of the invention.

FIG. 3 shows an example of a system 300 for producing the compartment specification 302 for an application 304 according to embodiments of the invention. The application 304 is executing in a fully capable compartment 306, provided by compartmentalization software 308. When the application makes a resource request, it makes a call to a system function. However, a wrapper function 310 in a wrapper library (not shown) is called instead of the system function. The wrapper library is loaded, for example, when or before the application 304 began executing in the fully capable compartment 306, or when a wrapper function is called. The wrapper functions 310 are secondary definitions of system functions. Therefore, the wrapper functions 310 are called instead of the system functions 312 in a way that is transparent to the application 304. Thus, for example, the application 304 does not require additional programming to be used within the system 300. For example, where the application 304 is being executed on a data processing system that includes the HP-UX operating system, the HP-UX operating system provides the functionality to load the wrapper library such that the functions within the wrapper library are called in place of the system functions, although the wrapper library may choose to call the system functions. In embodiments of the invention described with reference to FIG. 3, the operating system and/or the compartmentalization software may not need modification such that the invention can operate in the ways described.

Examples of system functions for which wrapper functions may be provided include "mep_open", "semget", "shm_open", "shmget" and "msgget" for inter-process communication, "create", "open", "mkdir" and "unlink" for file system access, and "socket", "bind" and "connect" for network communications. These and other system functions may be provided by the HP-UX operating system, although embodiments of the invention may be used with other operating systems (such as, for example, Linux and/or Microsoft Windows) that provide their own system functions and/or ways of using wrapper functions in place of the system functions.

The application 304 may be a process or a thread, or a number of processes and/or threads. The application 304 may be executing before it is moved into the fully capable compartment 306, or it may start executing in the compartment 306. The compartment 306 may alternatively contain multiple applications.

When the application 304 calls a wrapper function 310, the wrapper function adds a permission to the compartment specification 302, so that the compartment specification 302 indicates that the resource request is permitted. For example, where the application makes a resource request that comprises a request to open a file in a read-only mode, the wrapper function 310 records a permission including the file name and the mode of access (in this example, read-only) in the compartment specification 302. Therefore, the compartment specification 302 indicates that the application 304 is permitted to open that file in read-only mode. If the application 304 is subsequently executed in a secure compartment, according to the compartment specification 302, the application 304 will be able to access the file in read-only mode. The application 304 may be prevented from accessing other files, or the same file in a mode other than read-only mode, unless permission is provided in the compartment specification 302.

When the application 304 makes a resource request, it makes a call to a system function 312 with arguments that provide details of the resource request (for example, where the resource request is a request to open a file in a read-only mode, one argument may be the file name and another argument may be the mode). These arguments are passed to the wrapper function 310 when the wrapper function is called, and therefore the wrapper function is in possession of all of the details required to add a permission to the compartment specification 302.

The permission is recorded in the compartment specification in a manner that is appropriate for the compartmentalization software that will be used to execute the application 304 in a secure compartment. For example, where the compartmentalization software is Security Containment for the HP-UX operating system, the compartment specification is suitable for use with that compartmentalization software as indicated in "HP-UX IIi Security Containment Administrator's Guide". Alternatively, where the compartmentalization software is Type Enforcement for the SELinux operating system, the compartment specification is suitable for use with that software as indicated in "Configuring the SELinux Policy: Policy Language and the Example Policy Configuration". The above references are incorporated herein in their entirety by reference for all purposes.

The compartment specification 302 may already contain a permission corresponding to a resource request, for example if the application 304 has previously made the same resource request. In this case, the wrapper function 310 may choose not to record the permission in the compartment specification 302, or may amend the compartment specification. For example, where the application 304 accesses the same resource but with an access mode not indicated in the compartment specification, the new access mode may be recorded in the compartment specification 302 (for example, by amending an existing permission or creating a new permission).

Once the wrapper function 310 has recorded a new permission in the compartment specification 302, or has chosen not to record a new permission, the wrapper function calls the appropriate system function 312 such that the system function handles the resource request. The application 304 therefore executes with full functionality while the compartment specification 302 is being produced.

The application 304 may be executed until the compartment specification is fully populated with permissions. The application 304 may therefore be executed such that, while the compartment specification 302 is being produced, the application 304 requests all of the resources that would be used by the application 304. This may be done, for example, by causing the application 304 to execute all code paths. The application 304 may be provided with test functionality for the purposes of testing the application 304. This test functionality could be used to cause the application to execute all code paths and/or request all of the resources that would be used by the application 304. Thus, a complete compartment specification 302 is produced. However, in alternative embodiments, an incomplete compartment specification may be produced, and this may lead to reduced functionality of the application 304 when executing in a secure compartment. In this case, intervention by a user (such as, for example, a system administrator) may be required for the application 304 to continue to function correctly.

Once the compartment specification 302 has been produced, the application 304 may be executed in a secure compartment according to the compartment specification 302 in a manner similar to that shown for the application 102 in FIG. 1. Therefore, the application 304 may not request resources that it did not request while the compartment specification 302 was being produced. The security of the application 304 and/or the data processing system on which it is executing may therefore be improved over the application 304 executing outside of a secure compartment.

Figure 4:
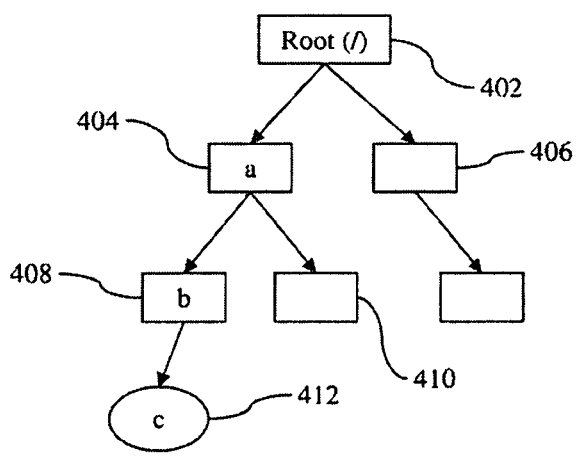
FIG. 4 shows an example of a file system.

An example of a method of producing a compartment specification will now be described with reference to FIG. 4. FIG. 4 shows an example of a virtual file system (VFS) structure 400. The structure 400 includes a root (/) directory 402, and two sub-directories 404 and 406. One of the sub-directories 404, called "a", has two further subdirectories 408 and 410. The sub-directory 408, called "b", contains a file 412 named "c".

An application executing in a fully-capable compartment may execute the following command:

open ("/a/b/c", OWRITE)

This command is an attempt to open the file 412 called "c" in the directory "/a/b" (which is the directory 408) on a file system. In a virtual file system (VFS), a command to open a file in a certain directory in this manner causes lookup operations to execute to determine the location of the file being accessed. For example, the open command above results in the following operations being executed:

lookup (NULL, "/")→V/
lookup (V/, "a")→Va
lookup (Va, "b")→Vb
lookup (Vb, "c")→Vc
open (Vc, OWRITE)

The first command searches for the location of the root directory "/" and stores the location in V/. The next command searches for the directory "a" within the root directory location V/, and stores the location of "a" in Va. The next command searches for the directory "b" within Va (the directory "a") and stores the location of "b" in Vb. The next command searches for the file "c" within Vb (the directory "b") and stores the location of "c" in Vc. The final command opens the file at location Vc (which is the file "c") in write-only mode.

These commands result in a compartment specification being produced for the application that contains the following permissions (rules):

| / | R/ |
|---|----|
| /a | Ra |
| /a/b | Rb |
| /a/b/c | Rc |

These rules show that the application can access "/" according to rule R/, "a" according to rule Ra, "b" according to rule Rb and "c" according to rule Rc. Rules R/, Ra and Rb are "search" permissions, i.e. a lookup to locate the corresponding directory is permitted. Rule Rc grants "search" and "write" permissions, resulting from the "lookup" and "open" commands above in respect of file "c" 412.

Therefore, when the application is executed within a compartment using the compartment specification that grants the above permissions, the application will be able to open the file "/a/b/c" 412 in write-only mode. The permissions shown above do not allow the application to perform other operations. For example, the application may not be able to open the file "c" 412 in read mode, or access another file in any mode.

Any application to be executed within a secure compartment may be associated with a compartment specification produced according to embodiments of the invention. For example, an Apache HTTP server application or BIND (Berkeley Internet Name Domain) DNS application may be executed in a secure compartment to prevent the application from being used to attack the data processing system on which it is executing, and/or any other resources or applications of the data processing system. The compartment specification produced using embodiments of the invention may be complete and does not contain errors as it records resource requests made by the application. Large and complex applications, such as enterprise applications, may be associated with large and complex compartment specifications produced using embodiments of the invention. A compartment specification produced according to embodiments of the invention may not require knowledge of the application and the data processing system on which it will execute, and the operating system of the data processing system.

Below is an example of a compartment specification produced using embodiments of the invention for an Apache web server application. The compartment specification has been produced such that it is usable with the Security Containment compartmentalization software. The compartment specification includes line numbers for the purposes of explanation, although the compartment specification may or may not include the line numbers.

```
01 compartment   Apache {
02      permission   read    /opt/hpws/apache
03      permission   write   /opt/hpws/apache/logs
04      permission   all     /var/tmp
05      permission   all     /tmp
06      permission   all     /dev/null
07
08      access fifo      init
09      access uxsock    init
10      access ipc       web
11
12      grant   bidir   tcp   port 80        ifaces
13      grant   bidir   udp   peer port 80   ifaces
14 }
```

Line 01 gives a name to the compartment. In the above compartment specification, the compartment is given the name "Apache".

Line 02 of the above example compartment specification allows the Apache web server application to read files from the /opt/hpws/apache directory when the Apache application is executing in a secure compartment. This line would have been added to the compartment specification while the compartment specification was being produced according to embodiments of the invention, for example by the application accessing this directory to read files. Embodiments of the invention may allow access to all files in a directory that was accessed during creation of the compartment specification, although in alternative embodiments access may be given for only specific files accessed by the application during creation of the compartment specification.

Line 03 allows the application to write to the /opt/hpws/apache/logs file. Line 04 allows the application all-permissions (for example, read, write, create, unlink and search permissions) for the /var/tmp directory. Line 05 allows the application all permissions for the /tmp directory. Line 06 allows the application all permissions for the /dev/null directory. Embodiments of the invention may, for example, automatically add certain permissions to the compartment specification, such as, for example, all permissions for the /tmp temporary files directory, although in other embodiments, access may not be automatically given.

Lines 08 and 09 allow the application to access the fifo and uxsock processes/applications that are executing in or are present in the compartment named "init". Line 10 allows the application to access the ipc process/application that is executing in or is present in the compartment named "web".

Line 12 allows the application to both send and receive (as indicated by "bidir") TCP protocol packets over port number 80 using processes/applications that are executing in or are present in the compartment named "ifaces" and/or using interfaces that belong to the "ifaces" compartment. Line 13 allows the application to send and receive UDP protocol packets over peer port number 80 using processes/applications that are executing in or are present in the compartment named "ifaces" and/or using interfaces that belong to the "ifaces" compartment.

Figure 5:
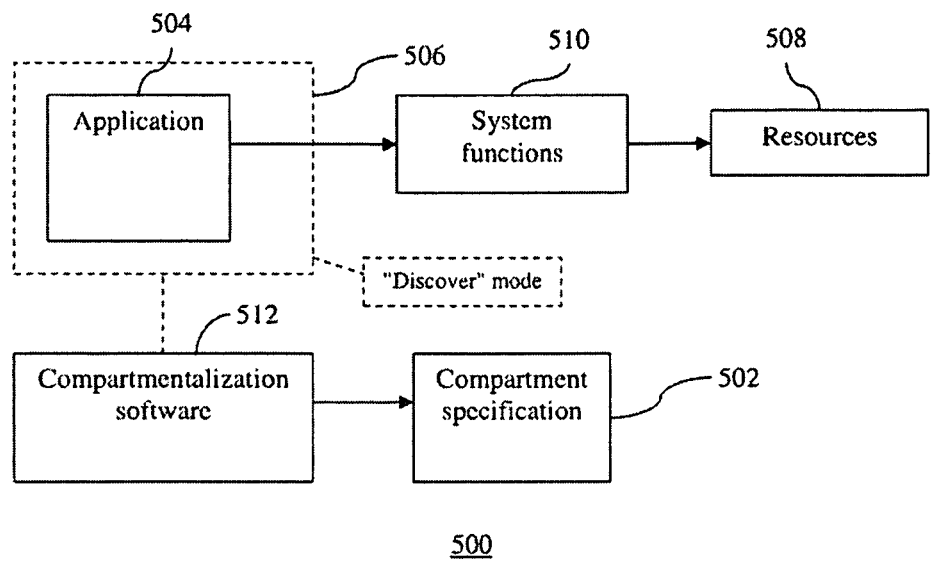
FIG. 5 shows another example of a system for producing a compartment specification according to embodiments of the invention.

FIG. 5 shows an example of a system 500 for producing a compartment specification 502 for an application according to alternative embodiments of the invention. The system 500 includes an application 506 within a compartment 506, resources 508 that are accessible by the application 504 via system functions 510 and compartmentalization software 512 for enforcing the compartment 506 when required.

The compartment 506 is marked (for example, by setting a software attribute) as being in "discover mode". In discover mode, the compartment 506 behaves as a fully-capable compartment, in that any access from within or outside of the compartment 506 is not blocked by the compartmentalization software 512. However, the compartmentalization software detects such accesses and may record the accesses in the compartment specification 502, thus producing (or adding to) the compartment specification 502. Such an embodiment does not require the use of a wrapper library or wrapper functions to intercept system function calls. However, the embodiment may require modification of the compartmentalization software and/or operating system such that the compartmentalization software recognises the "discover mode" £ attribute of the compartment 506 and can produce or augment the compartment specification 502.

In the above described embodiments of the invention, a compartment specification is generated for an application. However, a compartment specification may also be generated for a (non-application) resource in similar ways to those described above. Additionally or alternatively, respective compartment specifications can be produced for multiple compartments simultaneously, using one or a combination of the above described methods.

As described herein, a resource may be, for example, another application, and the application resource may be accessed, for example, using inter-process or inter-application communication system functions.

Figure 6:
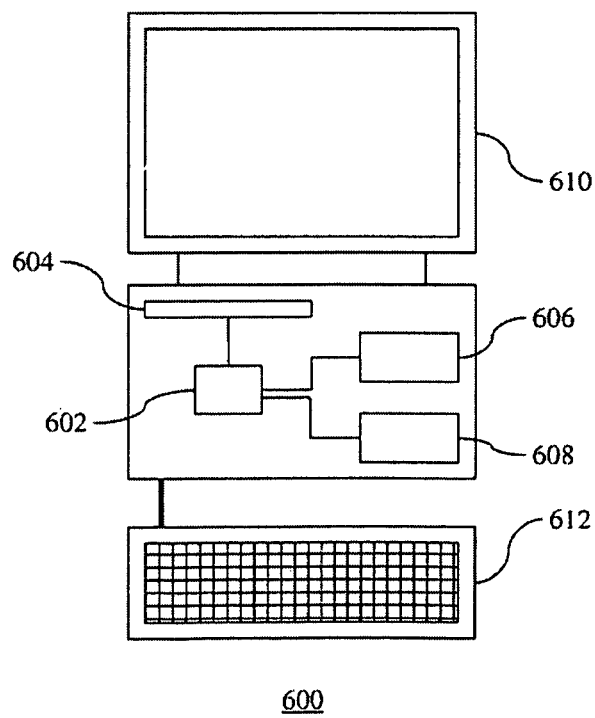
FIG. 6 shows an example of a data processing system suitable for implementing embodiments of the invention.

FIG. 6 shows a data processing system 600 suitable for use with implementations of embodiments of the invention. The data processing system 600 includes a data processor 602 and a memory 604. The system 600 may also include a permanent storage device 606 such as a hard disk, and/or a network communications device 608 for communicating with an external wired and/or wireless network such as, for example, a LAN, WAN or internet, The system 600 may also include a display device 610 and/or an input device 612 such as a mouse and/or keyboard.

A data processing system and/or an operating system on the data processing system may be changed to include new system functions for handling resources. In this case, where an application makes a resource request using a new system function when a compartment specification is being produced, a wrapper function will not be called in place of the system function as an appropriate wrapper function would not be available. This may lead to limited functionality of the application when executing in a secure compartment, as the resource requests using the new system functions would not be permitted by the compartment specification. Embodiments of the invention may be easily enhanced by providing a new wrapper library that includes wrapper functions corresponding to the new system functions. Therefore, a complete compartment specification may be produced using the new wrapper library. No system functions need to be patched, and a computer program implementing embodiments of the invention does not need to be patched, to update the wrapper library to include more wrapper functions.

In alternative embodiments of the invention, the operating system itself (for example, the system functions within the operating system) may be changed to implement embodiments of the invention. In this arrangement, a system function may determine whether a compartment is in "discover mode" and whether to cause a permission to be recorded, or whether to determine whether an access should be allowed or blocked based on the available compartment specification. Thus, wrapper libraries are not required. Although this approach requires modifications to the operating system, this approach may involve less coding than the wrapper library approach, as often multiple system calls lead to the same code in the operating system, and thus modification of a piece of code may implement embodiments of the invention with respect to multiple system functions.

Embodiments of the invention may be used, for example, by an application's developers or during installation or maintenance of the application to produce a compartment specification for the application. In other embodiments of the invention, for example, a system administrator or person installing or maintaining the application on a system may use embodiments of the invention to produce the compartment specification.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of producing a compartment specification for an application, comprising:
    executing the application;
    determining a resource request made by the executing application, wherein determining the resource request comprises defining wrapper functions that are called when the executing application makes the resource request, wherein the wrapper functions are to call associated system functions that handle the resource request, and wherein the wrapper functions are provided in a wrapper library; and
    recording a permission corresponding to the resource request in the compartment specification for the application, wherein the compartment specification contains a list of resources that the application is permitted to access.

2. A method as claimed in claim 1, wherein determining the resource request further comprises trapping the resource request made by the executing application.

3. A method as claimed in claim 1, wherein executing the application comprises executing the application in a compartment that allows access to at least all resources required by the application.

4. A method as claimed in claim 3, wherein the compartment allows access to all resources.

5. A method as claimed in claim 1, comprising executing the application in a compartment according to the compartment specification such that requests made by the application for resources that are not listed in the compartment specification are unsuccessful.

6. A non-transitory computer readable medium storing machine readable instructions, which when executed by a processor perform a method for producing a compartment specification for an application, the machine readable instructions comprising code to:
 execute the application;
 determine a resource request made by the executing application, wherein the code to determine the resource request comprises code to define wrapper functions that are called when the executing application makes the resource request, wherein the wrapper functions are to call associated system functions that handle the resource request, and wherein the wrapper functions are provided in a wrapper library; and
 record a permission corresponding to the resource request in the compartment specification for the application, wherein the compartment specification contains a list of resources that the application is permitted to access.

7. The non-transitory computer readable medium as claimed in claim 6, wherein the code to determine the resource request further comprises code to trap the resource request made by the executing application.

8. The non-transitory computer readable medium as claimed in claim 6, wherein the code to execute the application comprises code to execute the application in a compartment that allows access to at least all resources required by the application.

9. The non-transitory computer readable medium as claimed in claim 8, wherein the compartment allows access to all resources.

10. The non-transitory computer readable medium as claimed in claim 6, further comprising code to execute the application in a compartment according to the compartment specification such that requests made by the application for resources that are not listed in the compartment specification are unsuccessful.

11. A computer system to produce a compartment specification for an application, comprising:
 a memory storing machine readable instructions, which when executed are to:
  execute the application;
  determine a resource request made by the executing application, wherein the machine readable instructions to determine the resource request comprises machine readable instructions to define wrapper functions that are called when the executing application makes the resource request, wherein the wrapper functions are to call associated system functions that handle the resource request, and wherein the wrapper functions are provided in a wrapper library; and
  record a permission corresponding to the resource request in the compartment specification for the application, wherein the compartment specification contains a list of resources that the application is permitted to access; and
 a processor to execute the machine readable instructions stored in the memory.

* * * * *